Sept. 2, 1924.  
E. IBACH  
1,507,063  
LOCKING DEVICE FOR THE HUB CAPS OF DEMOUNTABLE WHEELS  
Filed March 20, 1920
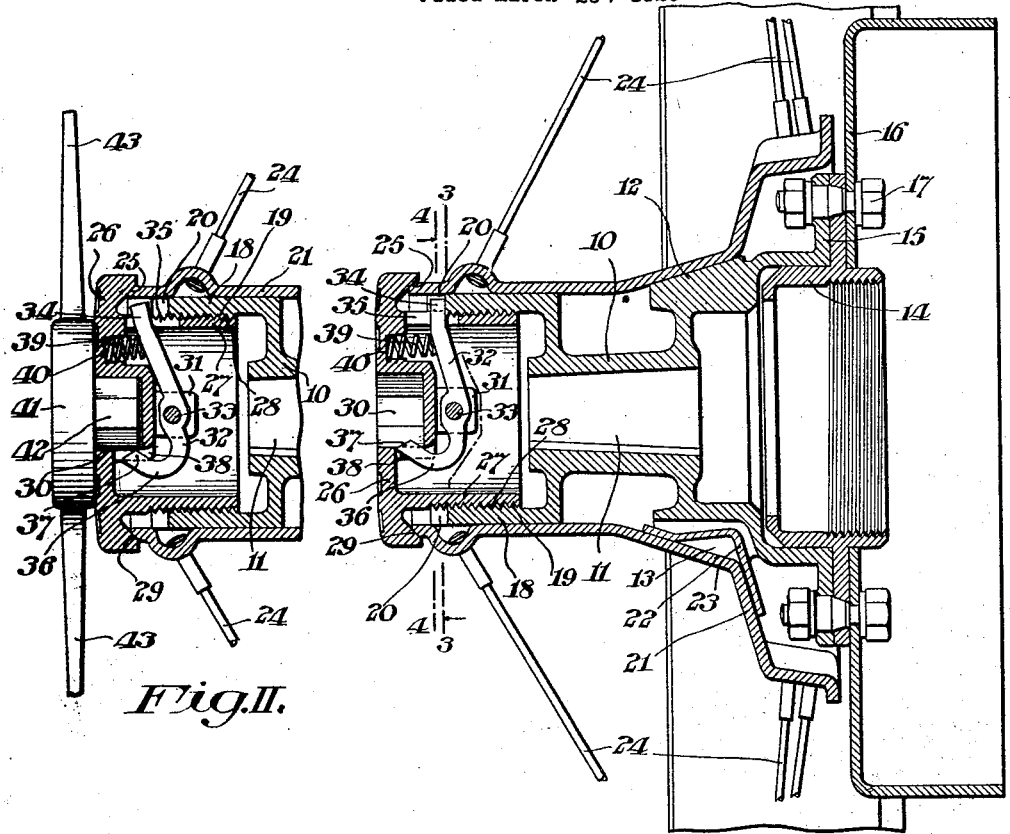
Fig.II.
Fig.I.
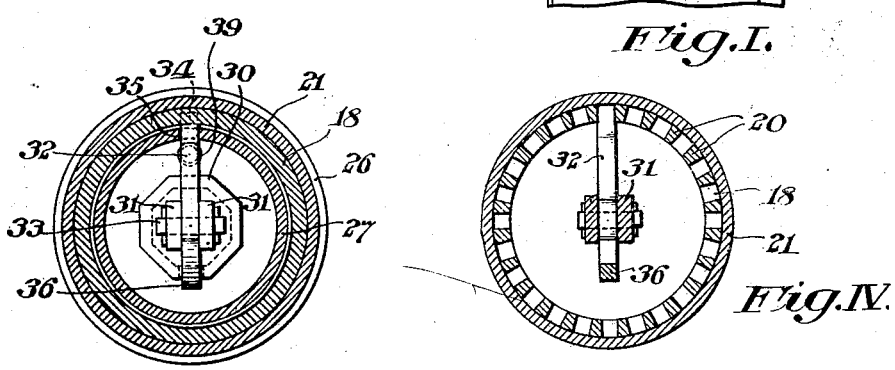
Fig.III.
Fig.IV.
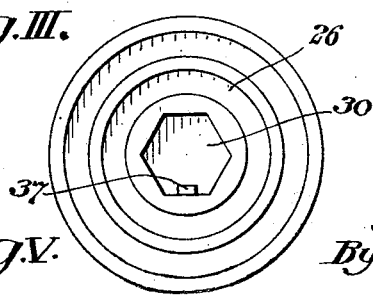
Fig.V.
Inventor  
Emil Ibach  
By Chester H. Braselton  
Attorney Patented Sept. 2, 1924.

1,507,063

UNITED STATES PATENT OFFICE.

EMIL IBACH, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

LOCKING DEVICE FOR THE HUB CAPS OF DEMOUNTABLE WHEELS.

Application filed March 20, 1920. Serial No. 367,463.

*To all whom it may concern:*

Be it known that I, EMIL IBACH, a citizen of Germany (who have declared my intention to become a citizen of the United States), residing at Philadelphia, Pennsylvania, have invented certain new and useful Improvements in Locking Devices for the Hub Caps of Demountable Wheels, of which I declare the following to be a full, clear, and exact description.

This invention relates to improvements in locking devices for the hub caps of demountable wheels.

One of the particular objects of my invention is to provide an improved hub cap locking device which is particularly simple in construction, and so designed that it may be easily produced in large quantities at a relatively low cost.

Another object of my invention is to provide a hub cap locking device which is easily actuated, but, at the same time, "foolproof" in operation, and which positively locks the hub cap against rotation relative to the member on which it is screwed.

Another object of my invention is to provide a hub cap locking device so designed as to permit of the hub cap being substantially flush with the outer end of the hub shell.

Further objects, and objects relating to economies of operation and production and details of construction, will definitely appear from the detailed description to follow. I accomplish the objects of my invention by the devices and means described in the following specification. My invention is clearly defined and pointed out in the appended claims. A structure, which may be a preferred embodiment of my invention, is illustrated in the accompanying drawing, forming a part of this specification, in which:

Figure I is a vertical, sectional view through a wheel hub and hub cap provided with a locking device embodying my invention.

Figure II is a view similar to the left hand part of Figure I, but showing the wrench applied and the latch withdrawn from engagement.

Figure III is a sectional view taken on the line 3—3 of Figure I.

Figure IV is a sectional view taken on the line 4—4 of Figure I, and

Figure V is a view in end elevation of the hub cap.

In the drawing, similar reference numerals refer to similar parts throughout the several views.

Considering the numbered parts of the drawing, I have shown an inner hub 10, having a tapered seat 11, by which the inner hub is connected to the axle shaft (not shown,) and a polygonal seat 12, the faces of which are provided with guide slots 13. The bearing retainer 14 is housed within the inner end of the inner hub, and the brake drum 16 is connected to the flange 15 by the bolts 17. The outer end 18 of the inner hub is cylindrical and internally threaded at 19, and a plurality of teeth 20 are formed in the outer edge of the cylindrical portion 18 of the inner hub. The faces of said teeth lie in planes radial to the axis of the hub.

The outer hub shell 21 is provided with a seating portion 22 of polygonal shape which seats on the portion 12 of the inner hub and carries the guide keys 23 fitting into the slots 13. The spokes 24 have their inner ends anchored in this hub shell in any suitable manner, and the outer end of the hub shell is beveled at 25 to aid in centering the shell.

The hub cap 26 has a cylindrical body portion 27 which is externally threaded at 28 and screwed on the threaded part 19 of the inner hub. The hub cap 26 has a marginal flange having a beveled inner surface 29 engaging the beveled end 25 of the outer hub shell. A socket 30, of polygonal cross section, is formed in the face of the hub cap 26. A pair of shoulders 31 project inwardly from the bottom of the socket within the hub cap, and a latch 32 is mounted on the pivot pin 33, which is carried by the shoulders 31. The socket 30 is co-axial with the hub and hub cap, and the pin 33 is in line with said axis. The end 34 of the latch 32 extends through a slot 35 formed in the side wall of the body portion 27 of the hub cap, in a position to engage the teeth 20. On the opposite side of this pivot 33, the latch 32 is reversely curved and projects through a slot 38 formed in the side wall of the socket 30, so that the inclined cam surface 37 at the end of the actuating arm 36, of the latch, projects within the socket 30. One end of spring 39 is seated in the recess 40 in the inner face of the hub cap, and the other end of said spring presses against the latch 32 forcing the portion 34 thereof into locking engagement with the teeth 20.

The latch is actuated by a wrench comprising the body portion 41, having a plug 42 of cross section to fit within the socket 30 and the handles 43 by which the wrench may be manipulated.

From the description of the parts given above, the operation of this locking device should be very readily understood. In Figure I, I have shown the hub cap locked to the inner hub, and it appears that the spring 39 presses the latch 32 on its pivot so that the portion 34 is held by the spring pressure in locking engagement with the teeth 20. In this position, the cam portion 37 of the actuating arm 36 projects within the socket 30. When it is desired to remove the hub cap, the plug 42 of the wrench 41 is inserted in the socket 30. The insertion of this plug, acting on the cam portion 37 of the latch, forces it back and rocks the latch on its pivot against the pressure of the spring 39, so as to withdraw the locking portion 34 from engagement with the teeth 20. This position of the parts is illustrated in Figure II. The locking device is designed to coact with teeth on the inner hub, so that the hub cap is locked to the inner hub on which it is screwed, and the outer hub is held as in a vise between the hub cap and the inner hub. The latch swings in a plane radial to the axis of the hub, but extends transversely thereof. Therefore, this latch lends itself particularly to a flush type hub cap, in which the face of the hub cap is substantially flush with the end of the hub shell. The parts of this locking device are few in number, and all of them can easily be made at a low cost, and the parts of the hub cap can be very conveniently and quickly assembled together to form the complete device shown.

I am aware that the particular embodiment of my invention, which I have shown and described here, is susceptible of considerable variation without departing from the spirit thereof, and therefore, I desire to claim the same broadly, as well as specifically, as indicated by the appended claims.

Having thus described my invention, what I claim as new and desire to secure by Letters Patent, is:

1. A device of the class described comprising the combination with an inner hub and an outer hub removably and non-rotatably mounted thereon, of a hub cap screwed on said inner hub having a socket of non-circular cross section in its face, and a latch pivoted to the base of said socket centrally of the hub cap and lying within the same, said latch having a locking arm extending to one side of said pivot through the side wall of said hub cap, and an actuating arm extending on the other side of said pivot and curved so that the free end thereof projects through the side wall of said socket.

2. A device of the class described comprising the combination with an inner hub and an outer hub removably and non-rotatably mounted thereon, of a hub cap screwed on said inner hub and having a socket of non-circular cross section in its face, and a peripheral, beveled flange adapted to engage the end of the outer hub, and a latch pivoted to the base of said socket and lying within said hub cap transversely of the axis thereof, having a locking arm extending through the side wall of said hub cap and an actuating arm extending through the side wall of said socket.

3. A device of the class described comprising the combination of an inner hub, an outer hub removably and non-rotatively mounted thereon, a hub cap screwed on one of said parts and engaging the other to hold said outer hub from removal, said hub cap having a wrench-receiving socket formed in the face thereof, and a latch pivoted within said hub cap and having a locking arm engaging locking means on one of said hub members and an actuating arm projecting through a wall of said socket and normally positioned within said socket.

4. A device of the class described comprising the combination of an inner hub, an outer hub removably and non-rotatively mounted thereon, a hub cap screwed on one of said parts, and engaging the other to hold said outer hub from removal, said hub cap having a wrench-receiving socket of polygonal cross-section formed in the face thereof, a latch pivoted within the hub cap substantially in line with the axis thereof, and swinging in a plane radial to said axis, said latch having an actuating arm projecting through a side wall of said socket.

5. A device of the class described comprising the combination of an inner hub, an outer hub removably and non-rotatively mounted thereon, a hub cap screwed on one of said parts and engaging the other to hold said outer hub from removal, said hub cap having a wrench-receiving polygonal socket formed in the face thereof with a slot in the side wall, and a latch pivoted centrally within said hub cap and having an actuating arm extending through the slot in the side wall of said socket and adapted to be engaged by the wrench when the latter is inserted in said socket.

6. A device of the class described comprising the combination of an inner hub, an outer hub removably and non-rotatably mounted thereon, a hub cap screwed on one of said parts and engaging the other to hold said outer hub from removal, said hub cap having a polygonal socket formed in the face thereof with a slot in its side wall, and a latch pivoted centrally within the hub cap, and having a locking arm extending through a slot formed in the side wall of the hub cap into co-operative engagement with locking means on the inner hub, and an actuating arm extending through the slot in the wall of said socket and having a cam portion projecting within said socket.

7. A device of the class described comprising the combination of an inner hub, an outer hub removably and non-rotatively mounted thereon, a hub cap screwed on one of said parts and engaging the other to hold said outer hub from removal, said hub cap having a polygonal socket formed in the face thereof with a slot in the side wall thereof, a pivot supported by the bottom of said socket centrally within said hub cap, and a latch mounted on said pivot and extending transversely of the hub cap, having a locking arm extending through a slot in the side wall of the hub cap, and an actuating arm projecting through the slot in the wall of the socket.

8. A device of the class described comprising the combination of an inner hub, an outer hub removably and non-rotatably mounted thereon, a hub cap screwed on one of said parts and engaging the other to hold said outer hub from removal, said hub cap having a polygonal socket formed in the face thereof with a slot in its side wall, a pivot supported by the bottom of said socket centrally within the hub cap, a latch extending transversely of the hub cap and mounted on said pivot, said latch having a locking arm projecting through a slot in the side wall of the hub cap into co-operative engagement with locking teeth on the inner hub and an actuating arm projecting through the slot in the side wall of the socket, and a spring seated in the inner face of the hub cap and engaging the locking arm to hold it in engagement.

In testimony whereof I affix my signature.

EMIL IBACH.